UNITED STATES PATENT OFFICE.

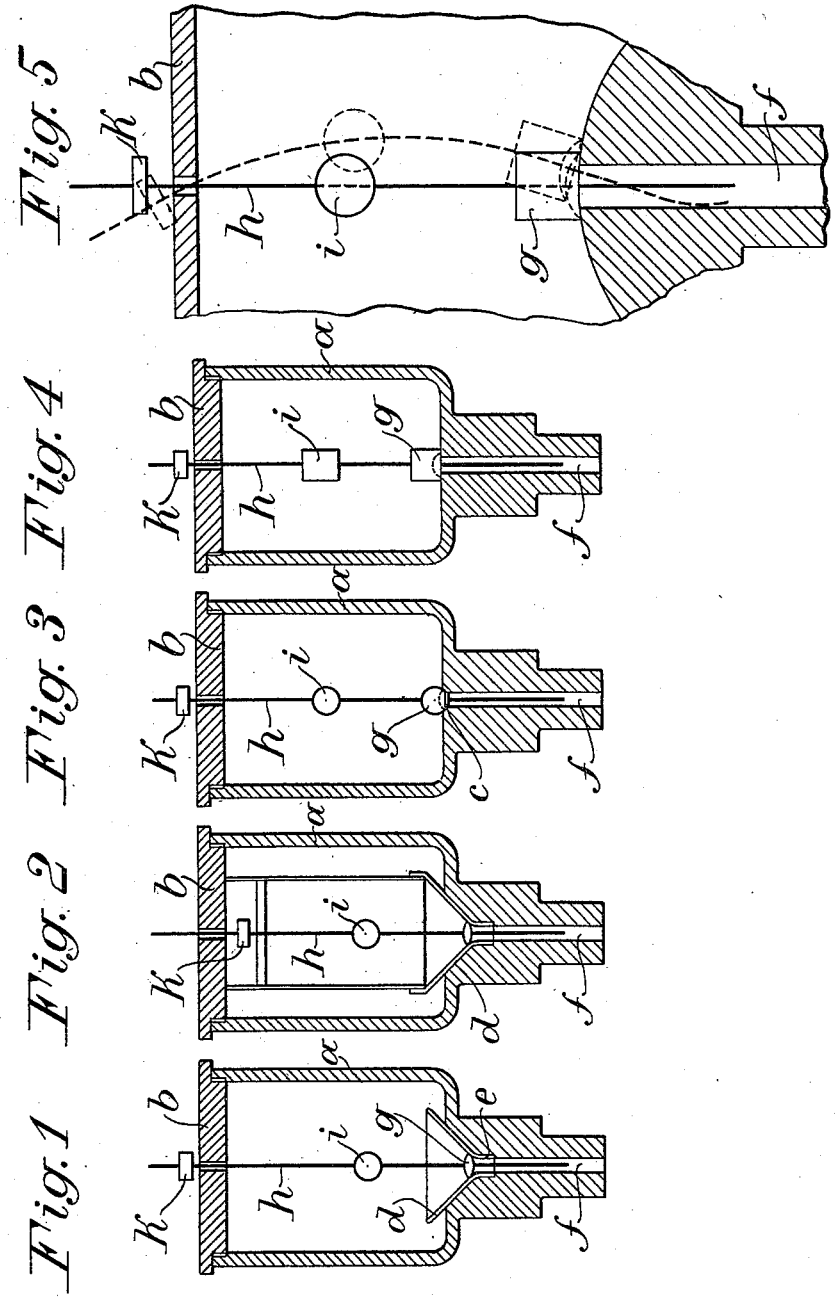

MAX GLASS, OF VIENNA, AUSTRIA-HUNGARY.

LUBRICATOR.

1,034,612.  Specification of Letters Patent.  Patented Aug. 6, 1912.

Application filed October 14, 1911. Serial No. 654,604.

*To all whom it may concern:*

Be it known that I, MAX GLASS, a subject of the Emperor of Austria-Hungary, residing at Vienna, Austria-Hungary, have invented certain new and useful Improvements in Lubricators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a lubricator with feeding valve actuated by the concussions of the machine and consists in that both the body of the valve and the valve weight securing its movement are arranged upon a thin flexible rod. This rod is loosely guided within the lubricator box and when the machine is undergoing a concussion said rod is being inflected and thus permits the valve body to be temporarily raised from its seat.

Some examples of execution of this lubricating device are shown in vertical section by the Figures 1 to 5 of the drawings. The receptacle $a$ intended to receive the lubricant is mounted according to the example of execution shown in Fig. 1 in a known manner upon the machine and is provided with a cover $b$ and in the bottom of its hollow interior with a recess preferably of conical shape which may be formed directly as a valve seat or as is shown serves for receiving the funnel $d$ which latter forms the valve seat. In order to maintain the funnel in position, it may be provided with a cylindrical neck $e$. The lubricating channel or passage $f$ and the bore of said neck $e$ serve to convey the lubricant to the place where it is used and this duct is closed by the valve body. The valve body $g$ is according to the same example of execution in the shape of a lens and is affixed to a thin, flexible rod $h$. One end of this rod projects into the lubricating channel or passage $f$, while the other end is loosely guided within the cover $b$; the rod, however, works loosely on its whole length so that its free motion is not hindered. Upon this rod there is furthermore mounted a weight $i$.

The device works in the following manner: As the machine moves for instance during the running of a locomotive engine or the like the concussions and vibrations originated thereby are transmitted to the lubricator and the rod with the weight mounted thereon will also participate of said vibrations. Now, the rod being rather thin relatively to the weight it is carrying and as it consists of yielding material, the weight, owing to said concussions will cause the rod to perform irregular oscillations. Thus, the rod will be deflected and again straightened by the action of the weight $i$. These movements of the rod will cause the valve body $g$ affixed thereto to move also and the valve body will be wholly or partly raised off from its seat, so that the outlet opening of the lubricating receptacle is cleared and the lubricant can flow out. This lubrication is continued as long as the machine is working. Whenever the machine stops running the concussions and vibrations cease, the weight comes to rest and causes the valve body to be held down onto its seat so that further admission of the lubricant to the machine is prevented. As has been previously mentioned, the rod is guided within the cover and projects out of the same. By lifting the rod while the machine is working or is at rest the valve disk can be raised from its seat, so that a sudden admission of a larger quantity of the lubricant takes place. In order to limit the downward stroke of the rod, a stop $k$ can be fixed upon the part of the rod projecting out of the lubricator. The removable piece $d$ also can be formed in the shape of a casing which has to be inserted into the proper lubricator vessel (Fig. 2).

According to the form of execution above described the valve seat is arranged on a funnel or on a removable part which possesses the advantage that the seat may be removed whenever it becomes clogged by impurities or damaged. By this arrangement the further advantage is obtained that as the funnel projects above the bottom-level, impurities contained in the lubricant and deposited on the said bottom, are prevented from depositing on the valve-seat.

In the modification shown in Fig. 3, the valve-body $g$ is in the shape of a ball having on its lower portion a hollow or recess so that a sharp edge is formed with which the valve-body rests upon its seat $c$. The valve seat can also be in the shape of a small cone. As shown in Fig. 4 the valve body can also be made in the shape of a cylinder which, similarly to the ball, Fig. 3, also has a recess and thus possesses a sharp edge. In this modification the valve body rests directly upon a horizontal surface forming its seat. In the cases as shown by the Figs. 3 and 4 it is of advantage to make the seat in the shape of a dome (Fig. 5) which at the same time guides and centers the valve-body; besides the outlet opening being at a higher level, the effect will be the same as with the funnel d (Fig. 1), viz., the deposited impurities will not be admitted to the outlet opening of the lubricator. The valve body slides along the said dome which guides the same to its closing position also, whereas when the rod is in its bent position (shown by dotted lines) the valve-body clears the outlet opening.

Claims:

1. A lubricator comprising a receptacle having a discharge passage, a resilient rod loosely mounted within the receptacle and passage, a valve on said rod normally closing the entire passage, and a weight on the rod above the valve.

2. A lubricator comprising a receptacle having a discharge passage, a loose resilient rod extending through the receptacle and into the passage, a valve on the rod normally closing the entire passage, and a weight on the rod above the valve.

3. A lubricator comprising a receptacle, a discharge conduit depending therefrom, a thin flexible rod extending through the receptacle and into the conduit, a valve normally seated on the inlet end of the conduit and a weight on the rod adapted to flex the same by vibrations of the receptacle.

4. A lubricator comprising a receptacle, a cover therefor, a discharge conduit depending from the bottom of the receptacle, a thin flexible rod extending through the cover and into the conduit, a valve normally seated on the inlet end of the conduit, a weight on the rod adapted to flex the same when the receptacle is vibrated, and a stop on the rod to limit the oscillation of the weight.

5. A lubricator comprising a receptacle, a cover therefor, a discharge conduit depending from the bottom of the receptacle, a thin flexible rod extending through the cover and into the conduit, a valve normally seated on the inlet end of the conduit, a weight on the rod adapted to flex the same when the receptacle is vibrated, and a stop on the rod above said cover to limit the oscillation of the weight.

6. A lubricator comprising a receptacle having a convex bottom provided with a central discharge aperture, a thin flexible rod extending through the aperture, a valve body on said rod having a recess in its bottom forming a sharp annular bearing edge adapted to surround the aperture, and a weight on the rod adapted to flex the same when the receptacle is vibrated.

7. A lubricator comprising a receptacle having a cover, and convex bottom provided with a central discharge aperture, a thin flexible rod extending through the receptacle and the aperture, a valve body on said rod having a recess in its bottom forming a sharp annular bearing edge adapted to surround the aperture, a weight on the rod adapted to flex the same when the receptacle is vibrated, and a stop on the rod above the cover adapted to engage the latter and limit the oscillation of the weight.

8. A lubricator comprising a receptacle, a discharge conduit therefrom, a valve controlling the conduit, a flexible rod secured to the valve, said rod arranged to contact near its upper end with a portion of the receptacle and near its lower end with the walls of the conduit, and a weight secured to the rod between said points of contact to flex the same to rock the valve.

In testimony that I claim the foregoing as my invention, I have signed my name in presence of two subscribing witnesses.

MAX GLASS.

Witnesses:
EDWARD SYBURY,
AUGUST FUZZER.

---

Copies of this patent may be obtained for five cents each, by addressing the "Commissioner of Patents, Washington, D. C."